(12) United States Patent
Wenger et al.

(10) Patent No.: US 10,638,146 B2
(45) Date of Patent: Apr. 28, 2020

(54) TECHNIQUES FOR QP CODING FOR 360 IMAGE AND VIDEO CODING

(71) Applicant: TENCENT America, LLC, Palo Alto, CA (US)

(72) Inventors: Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 17 days.

(21) Appl. No.: 16/148,380

(22) Filed: Oct. 1, 2018

(65) Prior Publication Data

US 2020/0107037 A1 Apr. 2, 2020

(51) Int. Cl.
| | |
|---|---|
| *H04N 13/161* | (2018.01) |
| *H04N 19/176* | (2014.01) |
| *H04N 19/124* | (2014.01) |
| *H04N 19/44* | (2014.01) |

(52) U.S. Cl.
CPC .......... *H04N 19/45* (2014.11); *H04N 13/161* (2018.05); *H04N 19/124* (2014.11); *H04N 19/176* (2014.11)

(58) Field of Classification Search
CPC .... H04N 19/45; H04N 13/161; H04N 19/124; H04N 19/176
See application file for complete search history.

(56) References Cited

U.S. PATENT DOCUMENTS

| | | | |
|---|---|---|---|
| 2005/0180502 A1 | 8/2005 | Puri | |
| 2010/0195923 A1 | 8/2010 | Hallapuro et al. | |
| 2012/0328004 A1* | 12/2012 | Coban | H04N 19/105 |
| | | | 375/240.03 |
| 2013/0058410 A1* | 3/2013 | Yasugi | H04N 19/176 |
| | | | 375/240.12 |
| 2014/0079135 A1* | 3/2014 | Van der Auwera | H04N 19/70 |
| | | | 375/240.18 |
| 2014/0307777 A1 | 10/2014 | Sole Rojals et al. | |
| 2015/0172544 A1 | 6/2015 | Deng et al. | |
| 2015/0373327 A1* | 12/2015 | Zhang | H04N 19/124 |
| | | | 375/240.03 |
| 2017/0134759 A1 | 5/2017 | Wedi et al. | |
| 2019/0238849 A1* | 8/2019 | Fang | H04N 19/124 |

OTHER PUBLICATIONS

International Search Report in International Application No. PCT/US2019/032579, dated Jul. 24, 2019.

* cited by examiner

*Primary Examiner* — Farzana Hossain
(74) *Attorney, Agent, or Firm* — Sughrue Mion, PLLC

(57) ABSTRACT

A method for decoding a coded image or picture in a coded video sequence in a decoder, the image or picture representing a projection on a planar surface of a non-planar surface, the decoder employing a de-quantization step, may include obtaining at least one interim delta quantizer parameter (QP) value pertaining to at least one first block of a plurality of first blocks. The method may include decoding a QP value pertaining to a second block. The method may include combining a delta QP value and the QP value to generate a final QP value. The method may include inverse quantizing at least one value related to the second block using the final QP value.

20 Claims, 16 Drawing Sheets

FIG. 8 Equirectangular Projection of Earth 801

FIG. 9, Kavrayskiy-VII Projection 901

FIG. 12, Kavrayskiy-VII Projection 1201

Computer System 1600

TECHNIQUES FOR QP CODING FOR 360 IMAGE AND VIDEO CODING

FIELD

The disclosed subject matter relates to image and video coding and decoding, and more specifically, to the efficient coding of the quantizer parameter syntax element based on a relationship of the statistics of the (spatial) geometry of the content, in environments where the input to a planar video codec has been artificially created from non-planar content such as 360 video.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that:higher allowable/tolerable distortion can yield higher compression ratios.

A video encoder and decoder can utilize techniques from several broad categories, including, for example, motion compensation, transform, quantization, and entropy coding, some of which will be introduced below.

Video coding according to the above technologies, historically, has often assumed input content captured from a single camera. Other content that has attracted attention is known as stereoscopic content: two camera signals from cameras spatially aligned such that the axis of capture is approximately parallel, when combined in a suitable renderer, can provide the illusion of a three-dimensional picture when viewed under certain conditions. As the camera signals are highly correlated, certain video coding technologies have been devised that correlate the two signals to obtain a coding efficiency higher than what the coding efficiency could be when both signals were coded individually. One of such technologies is known as multiview coding, as available in the form of profiles in both H.264 and H.265. In some cases, such Multiview coding can be extended to the combined coding of more than two camera signals, while still leveraging the similarity, if any, of the multiple camera signals. However, multiview coding in the aforementioned sense still operates on planar camera images.

Recently, input devices have become available that include potentially many cameras at capture angles that are not parallel. To the extent possible based on the physical layout, those input devices allow to capture a spherical volume of space. Such cameras may be marketed, and are referred to herein, as "360 cameras," as they may capture a 360 degree field of view in all dimensions. Still image 360 cameras may operate by using a pan-tilt camera head which mounts a single camera with a lens that may capture a comparatively wide angle. By rotating both axis of the pan-tilt head to certain positions before taking a shot, a sequence of still images can be captured by the camera in such a way that the individual still images overlap to some extent. Using geometric information consistent with the control information used to control the pan tilt camera head, these images can be geometrically corrected and stitched together to form a planar image that can be input into traditional image processing technologies, for example for the purpose of compression and transmission. The geo-correction and stitching process is referred to herein as "projection." Rendering a 360 image can involve the selection of a viewpoint or viewing direction pertaining to the 360 captured scene, reverse geometric correction, de-stitching, etc., to create a planar image suitable for viewing. The reverse geometric correction and de-stitching is referred to herein as "de-projection" or "inverse projection." Ideally, the scene depicted in that image would be the same as if a planar image would have been captured in the viewing direction or from the selected viewpoint.

The above concept can be extended to the capture of video, as video can be represented by a series of still images captured and rendered in sufficiently short time intervals. 360 video capable cameras are commercially available in two basic variants. A first variant uses a rapidly rotating camera head with one or more cameras and appropriate lenses arranged such that, over the course of one rotation, a 360 degree scene (in one dimension) can be shot. The one or more cameras and lenses may be arranged such that the other dimension is covered. In order to obtain a frame rate of, for example 60 frames per second, the camera head has to rotate at, for example, a minimum of 3600 revolutions per minute. In order to avoid camera blur, the capture time of the cameras may have to be selected very short, which may limit the number photons the camera sensors are exposed to, leading to noisy images, need of high illumination of the scene, or both. Other implementations can omit the mechanically critical rotating head through the use of many cameras and appropriate lenses that are arranged such that the overlapping view of all cameras and lenses captures the whole 360 degree sphere, avoiding the aforementioned problems at the additional cost of requiring many more cameras and lenses. Mixing forms of the two concepts are also possible. Due to the decreasing cost of electro-optical components relative to mechanical components, there appears to be a trend away from mechanical 360 cameras towards multi-lens cameras. Further, some designs omit the capture in certain, often relatively narrow, capture angles based on the understanding that the 360 camera, being a physical device, necessarily needs to be mounted somewhere, and that the mounting hardware is likely of limited interest to the viewers. Like in the still camera above, many 360 capable cameras geometrically project the images (captured in the same instant in time, or nearly so in case of a rotating head) together so to form a series of projected images representing a 360 degree view of the camera.

The projection of an image representing a spherical capture scene onto a planar surface has been a known and well-studied problem for centuries. One well-known projection is, for example, the Mercator projection, introduced in 1569, which is a cylindrical projection and still in use in many maps of the world. Since then, many other projections have been devised, including, for example, equirectangular projection, conic projection, Aitoff projection, Hammer projection, Plate Carree projection, and so forth. Referring to FIG. 1, shown are a few (of many) projections that may be suitable for the mapping of spherical capture scene onto a planar surface, and have been studied in the context of 360 degree video compression. Shown is a globe (101), with three projections to a planar map of the globe. The first projection is known as equirectangular projection (102). The second projection is a cubical projection, wherein the surface of the globe is projected on six square, flat, square surfaces that represents the six directions at 90 degree displacement in each dimension. The six squares can be arranged on a single planar surface, resulting in a cube map (103). The arrangement of the surfaces of the cube in the planar surface presented here is one of several options. Finally, an icosahedronal projection projects the globe's surface on the surface of an icosahedron (104) (a three-dimensional symmetric geometric figure composed of 20 triangular flat surfaces), and those 20 triangular surfaces can be arranged on a single planar surface (105). Again, many sensible options exist for the spatial allocation of the 20 triangular surfaces on the single planar surface (105).

These, and other suitable projection formats attempt to map a spherical surface to a planar surface. The planar representation necessarily cannot be a mathematically correct representation of the geometric features of the sphere, but rather an approximation which has a certain amount of error. Where, spatially, that error is located and how big it can become depends on the nature of the projection. For example, it is well known that the equidistant projection significantly overstates longitudinal distances at latitudes far away from the equator. For example, in an equidistant projected map of the world, the island of Greenland is depicted larger than the continent of Australia, although in reality it has only about $\frac{1}{3}^{rd}$ of the surface area.

SUMMARY

According to an aspect of the disclosure, a method for decoding a coded image or picture in a coded video sequence in a decoder, the image or picture representing a projection on a planar surface of a non-planar surface, the decoder employing a de-quantization step, may include obtaining at least one interim delta quantizer parameter (QP) value pertaining to at least one first block of a plurality of first blocks; decoding a QP value pertaining to a second block; combining a delta QP value and the QP value to generate a final QP value; and inverse quantizing at least one value related to the second block using the final QP value; wherein if respective spatial positions of samples in the second block are included in a single first block of the plurality of first blocks, the delta QP value is set to an interim delta QP value of the single first block; or if the respective spatial positions of the samples in the second block are included in multiple first blocks of the plurality of first blocks, the delta QP value is set based on an interim delta QP value of at least one of the multiple first blocks of the plurality of first blocks.

According to an aspect of the disclosure, a device may include at least one memory configured to store program code; at least one processor configured to read the program code and operate as instructed by the program code to obtain at least one interim delta quantizer parameter (QP) value pertaining to at least one first block of a plurality of first blocks; decode a QP value pertaining to a second block; combine a delta QP value and the QP value to generate a final QP value; and inverse quantize at least one value related to the second block using the final QP value; wherein if respective spatial positions of samples in the second block are included in a single first block of the plurality of first blocks, the delta QP value is set to an interim delta QP value of the single first block; or if the respective spatial positions of the samples in the second block are included in multiple first blocks of the plurality of first blocks, the delta QP value is set based on an interim delta QP value of at least one of the multiple first blocks of the plurality of first blocks According to an aspect of the disclosure, a non-transitory computer-readable medium may store instructions that, when executed by one or more processors of a device, cause the one or more processors to: obtain at least one interim delta quantizer parameter (QP) value pertaining to at least one first block of a plurality of first blocks; decode a QP value pertaining to a second block; combine a delta QP value and the QP value to generate a final QP value; and inverse quantize at least one value related to the second block using the final QP value; wherein if respective spatial positions of samples in the second block are included in a single first block of the plurality of first blocks, the delta QP value is set to an interim delta QP value of the single first block; or if the respective spatial positions of the samples in the second block are included in multiple first blocks of the plurality of first blocks, the delta QP value is set based on an interim delta QP value of at least one of the multiple first blocks of the plurality of first blocks.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

A 360 video compression system may operate by first using a projection, for example equirectangular projection, cube projection, and so forth, to map an image of a 360 video sequence into a planar picture, and that planar picture, or a sequence thereof, may be subject to compression. Compression techniques for planar images and video are well known, but are optimized for input material where the relevance of each sample is approximately similar. Geometrical inaccuracies and errors introduced through the projection step, however, render the planar image such that certain areas and samples of the planar representation are less relevant than others, in that they represent a comparably smaller surface area on the sphere from which they were projected from. In order to gain the highest rate distortion performance when measuring the performance of representing the sphere's surface (instead of the planar projection), certain optimizations are be required in the planar compression technology, as it is suboptimal in unmodified form. In particular, the quantizer parameter may need to be adjusted in a certain way to reflect the surface area on the sphere represented by a single sample in the projection. Certain areas of the projection may need coarser quantization, and others finer quantization, in order to retain the same fidelity after inverse projection on the sphere. The amount of quantizer adjustment (delta-QP henceforth) required can be derived from a combination of the characteristics of the video compression technology or standard, and the geometric properties of the projection. Signaling the adjusted QP in the coded video bitstream may be possible. However, such signaling costs bits, and those bits may be saved (thereby increasing rate-distortion performance of the system) when encoder and decoder, based on common knowledge of the characteristics of the projection, adjust their QP in accordance with the required delta QPs.

DETAILED DESCRIPTION

Figure 1:
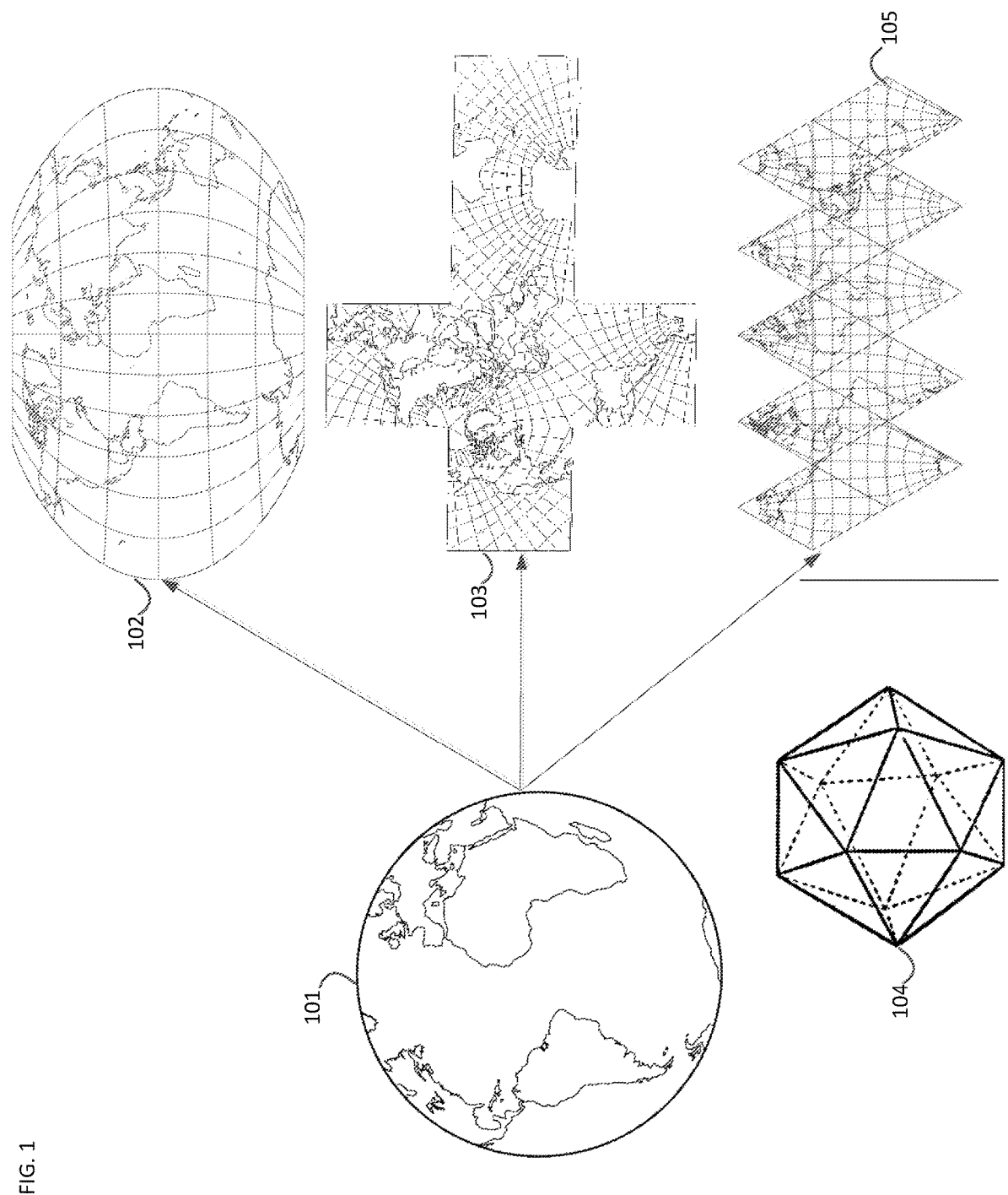
FIG. 1 is a schematic illustration of several projections in accordance with prior art.
Figure 2:
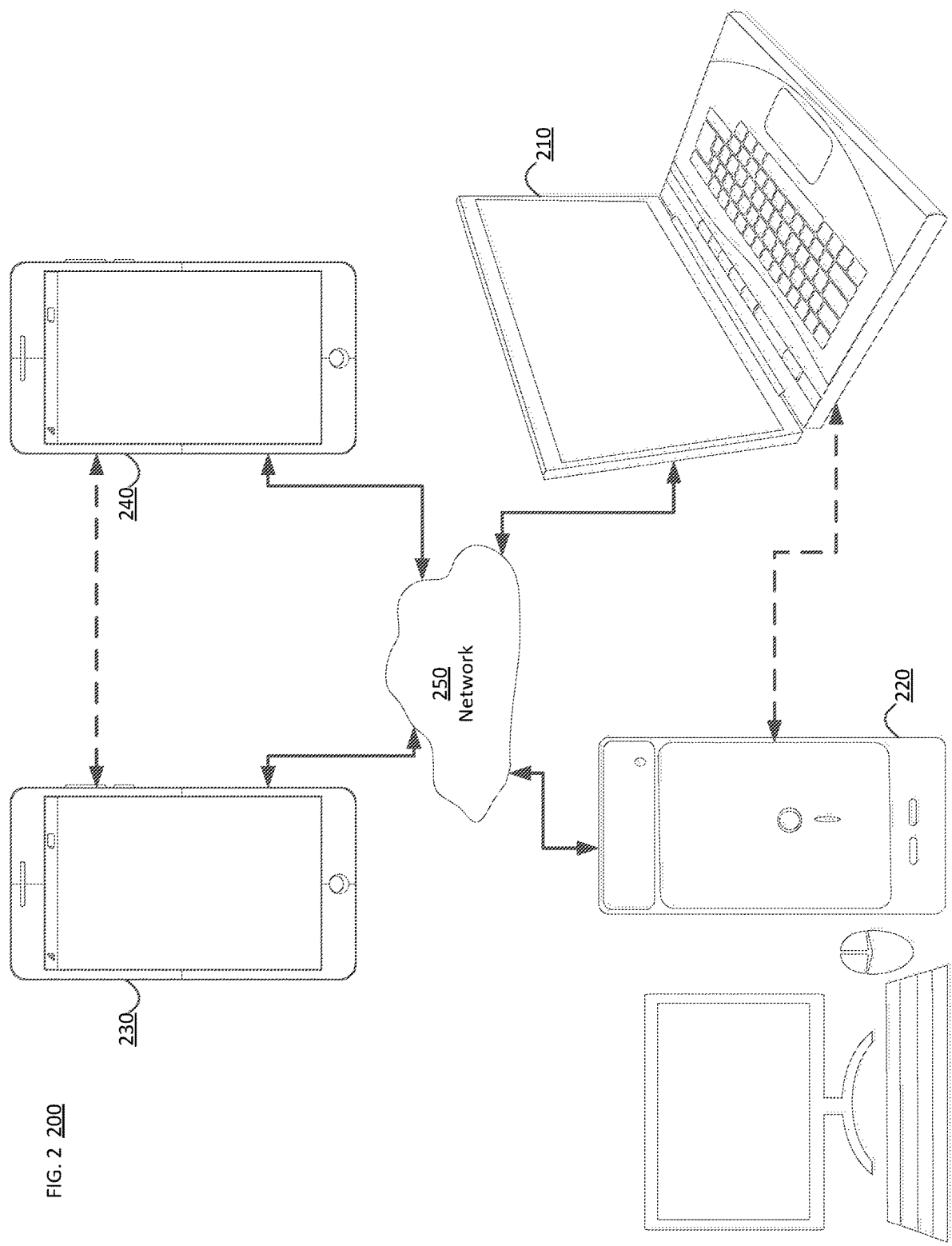
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
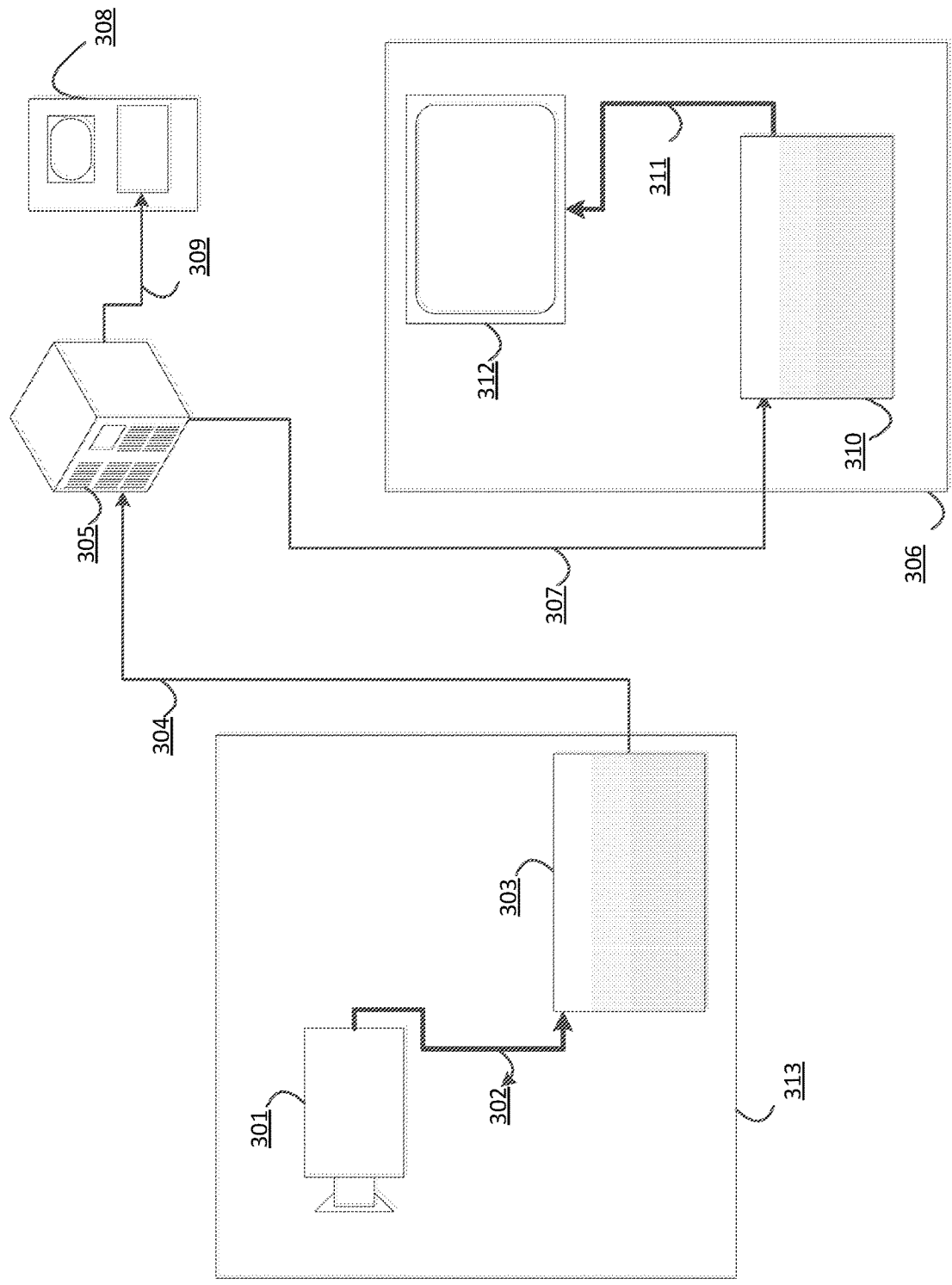
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
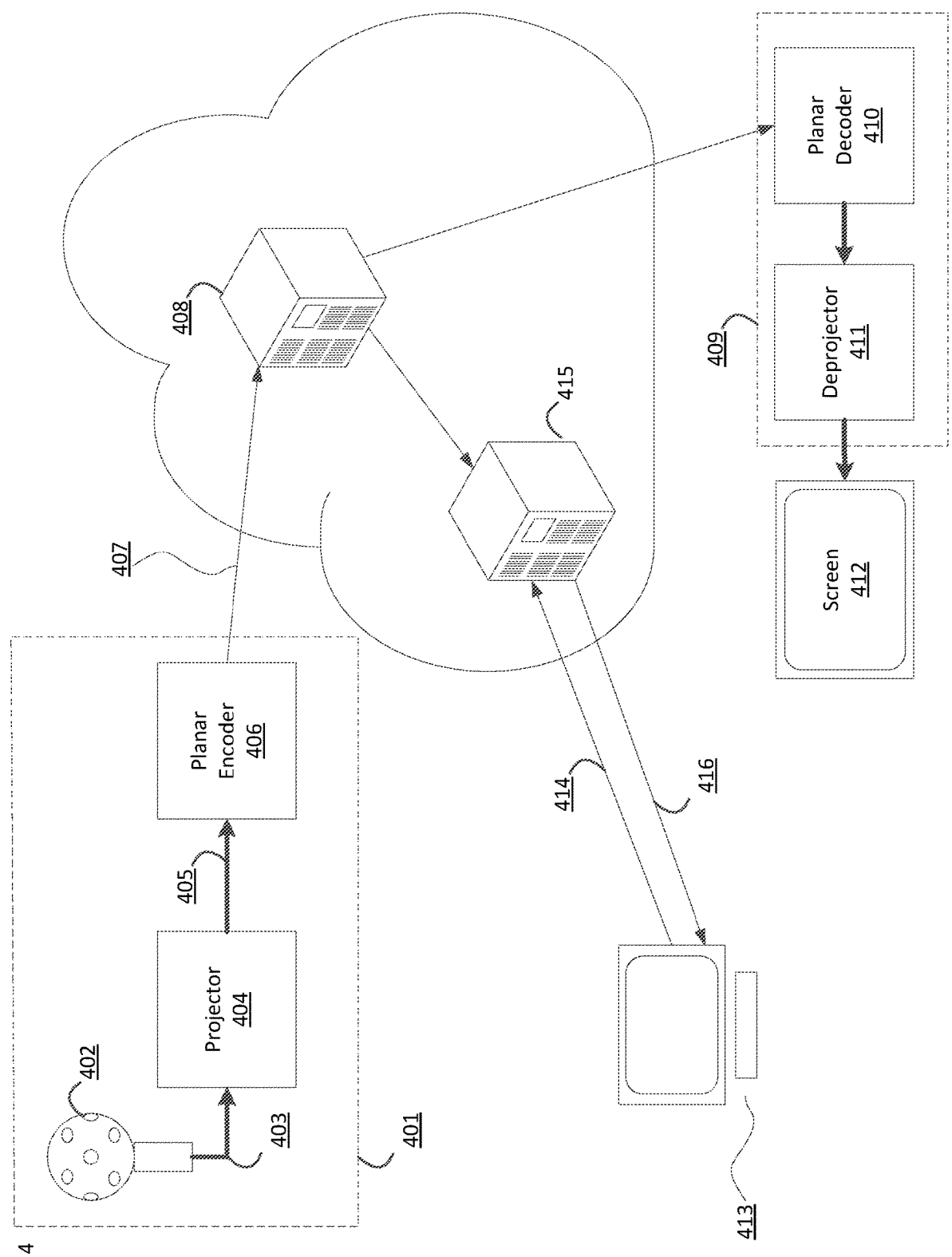
FIG. 4 is a schematic illustration of a simplified block diagram of a 360 communication/streaming system.

The communication system 200 or streaming system of FIG. 3 can be extended to enable the use of 360 video. Referring to FIG. 4, a layout of such a 360 system can be as follows. The 360 video capture unit (401) can include a 360 capable video camera (402) and a projector (404) that projects the incoming 360 images (403) into planar images (405). The 360 images (403) and the planar images (405) are depicted as boldface arrow so to emphasize the high data rate when compared to compressed signals, such as the coded video sequences (407). The planar images can be converted by a planar encoder (406) into one or more coded video sequences (407), that can also include side metainformation related, for example, to the projection that was generated by or obtained from the projector (404). The coded video sequences (407) can be forwarded directly to a decoder/renderer over a network (not depicted), or can be stored on a streaming server (408). The streaming server (408) can stream the coded video sequences directly to a 360 video capable endpoint (409), which can include a (planar) decoder (410) and a deprojector (411). The deprojector (411) can, for example inverse the projection introduced by projector (404) such that one or more image sequences are formed that are suitable for display, preferably by a device such as virtual reality goggles (not depicted), pseudo-3D capable screens (412), and the like. The deprojector may be controlled by a user interface (not depicted) that allows the user to select a viewing angle, viewpoint, and the like. This data flow can require the full 360 video presentation, as projected and compressed by projector (404) and encoder (406), to be streamed to the 360 capable endpoint (409).

As an alternative or in addition, in some cases a receiving endpoint may not have the connectivity or the computational resources to perform the decoding of all data required to reconstruct the full 360 degree scene, or the inverse projection. In such cases, a traditional (non-360 capable) endpoint (413) can send meta-information (414), obtained for example from its user interface, related to the viewpoint to a 360 processor (415) located in the network. The 360 processor can perform the tasks of the 360 capable endpoint based on the meta information obtained, and then re-encode in a traditional (planar-optimized) encoder the rendered planar video (416) for consumption by the traditional endpoint (413). In such a scenario, the computationally heavy decoding of the 360 scene and the inverse projection can be offloaded into cloud-based resources like the 360 processor (415). As described, the 360 processor can act as a transcoder in that it has both decompression and compression mechanisms.

In some cases, some of the 360 data, when properly formed and appropriately marked, can be removed by a Selective Forwarding Unit (SFU). If, for example, the projection format is cube projection, then, for any given viewpoint, at least three and up to five of the six planar square representations are not required for rendering (a non-transparent source sphere assumed). A properly configured SFU that is aware of the viewpoint, for example because it has received metadata such as the one the 360 processor (415) is using, can omit forwarding the unnecessary 360 data, assuming that the bitstream is properly formed, for example through the use of slices, tiles, layers, views, and so forth. Such a SFU can be viewed as a lightweight transcoder that does not include some of the signal processing technologies a full transcoder can require.

Figure 5:
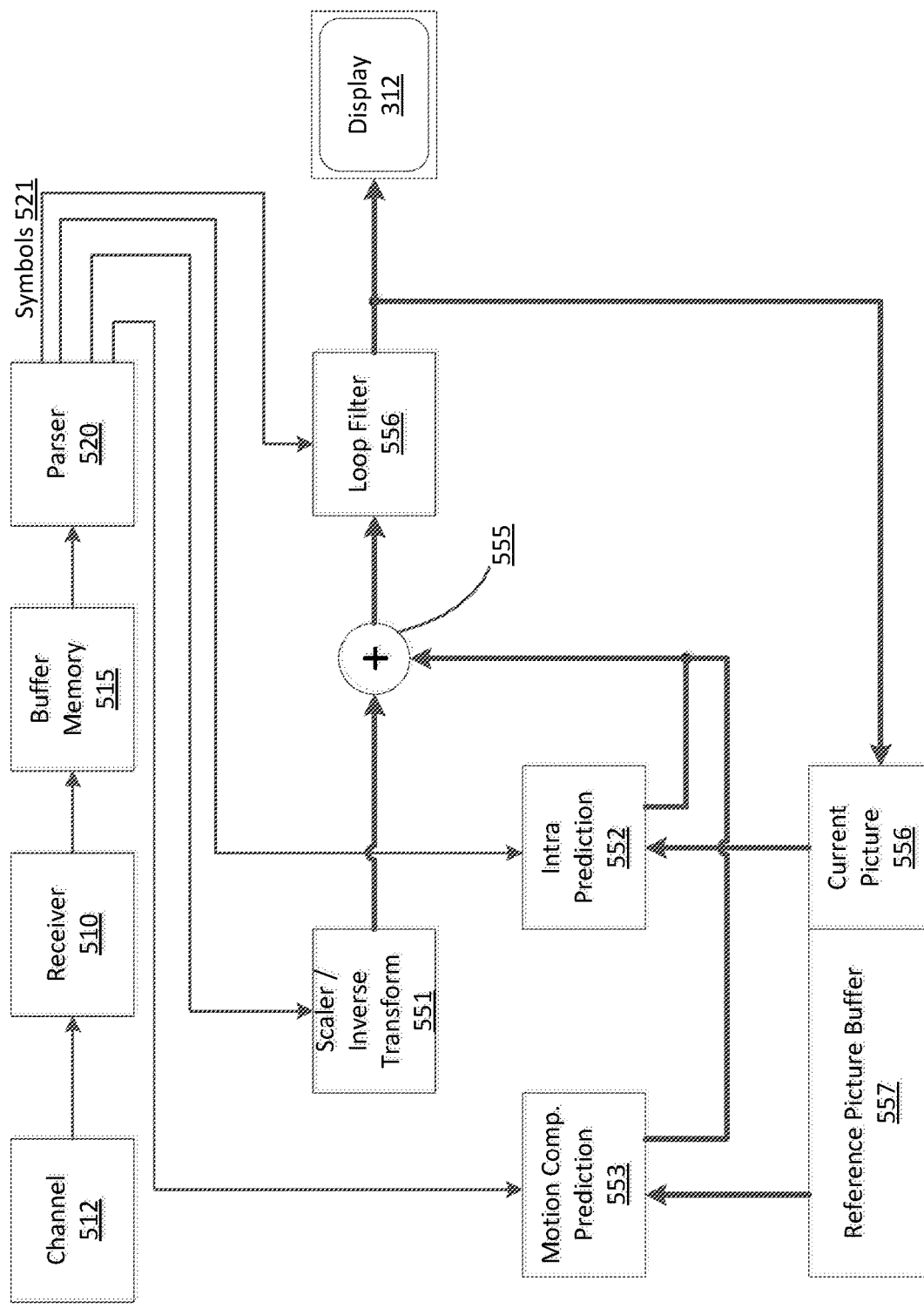
FIG. 5 is a schematic illustration of a simplified block diagram of a decoder in accordance with an embodiment.

FIG. 5 may be a functional block diagram of a video decoder (310) according to an embodiment of the present invention.

A receiver (510) may receive one or more codec video sequences to be decoded by the decoder (310); in the same or another embodiment, one coded video sequence at a time, where the decoding of each coded video sequence is independent from other coded video sequences. The coded video sequence may be received from a channel (512), which may be a hardware/software link to a storage device which stores the encoded video data. The receiver (510) may receive the encoded video data with other data, for example, coded audio data and/or ancillary data streams, that may be forwarded to their respective using entities (not depicted). The receiver (510) may separate the coded video sequence from the other data. To combat network jitter, a buffer memory (515) may be coupled in between receiver (510) and entropy decoder/parser (520) ("parser" henceforth). When receiver (510) is receiving data from a store/forward device of sufficient bandwidth and controllability, or from an isosynchronous network, the buffer (515) may not be needed, or can be small. For use on best effort packet networks such as the Internet, the buffer (515) may be required, can be comparatively large and can advantageously of adaptive size.

The video decoder (310) may include a parser (520) to reconstruct symbols (521) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (520) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (520) may perform entropy decoding/parsing operation on the video sequence received from the buffer (515), so to create symbols (521). The parser (520) may receive encoded data, and selectively decode particular symbols (521). Further, the parser (520) may determine whether the particular symbols (521) are to be provided to a Motion Compensation Prediction unit (553), a scaler/inverse transform unit (551), an Intra Prediction Unit (552), or a loop filter (556).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives quantized transform coefficient as well as control information, including which transform to use, block size, quantization factor, quantization scaling matrices, etc. as symbol(s) (521) from the parser (520). It can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current (partly reconstructed) picture (556). The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a Motion Compensation Prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (521) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video bitstream and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (312) as well as stored in the reference picture memory (556) for use in future inter-picture prediction.

Certain coded pictures, once fully reconstructed, can be used as reference pictures for future prediction. Once a coded picture is fully reconstructed and the coded picture has been identified as a reference picture (by, for example, parser (520)), the current reference picture (556) can become part of the reference picture buffer (557), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (510) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 6:
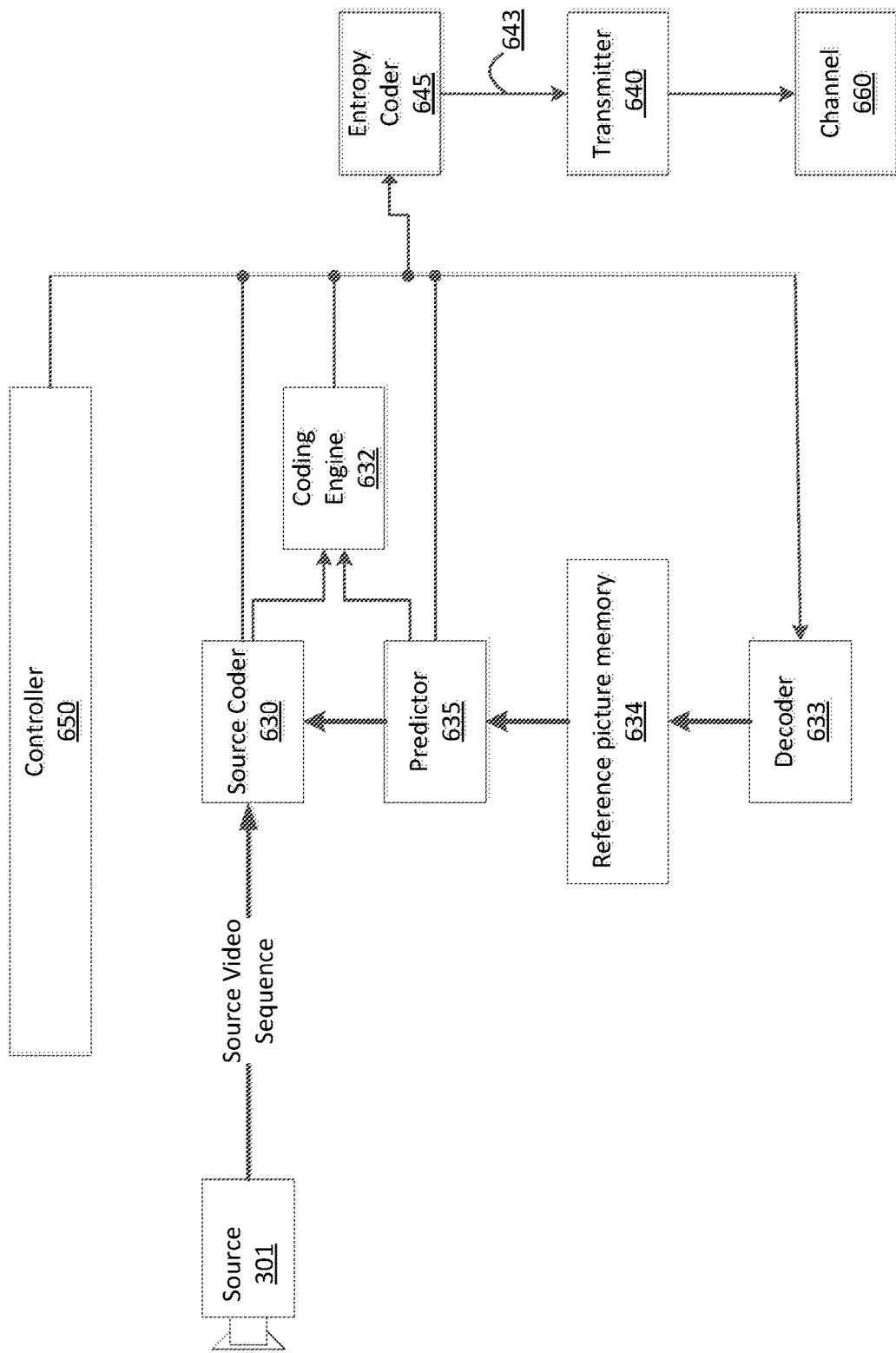
FIG. 6 is a schematic illustration of a simplified block diagram of an encoder in accordance with an embodiment.

FIG. 6 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (643) in real time or under any other time constraints as required by the application. Enforcing appropriate coding speed is one function of Controller (650). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (650) as they may pertain to video encoder (303) optimized for a certain system design.

Some video encoders operate in what a person skilled in the art readily recognizes as a "coding loop." As an over-simplified description, a coding loop can consist of the encoding part of an encoder (630) ("source coder" henceforth) (responsible for creating symbols based on an input picture to be coded, and a reference picture(s)), and a (local) decoder (633) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (634). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (633) can be the same as of a "remote" decoder (310), which has already been described in detail above in conjunction with FIG. 5. Briefly referring also to FIG. 5, however, as symbols are available and en/decoding of symbols to a coded video sequence by entropy coder (645) and parser (520) can be lossless, the entropy decoding parts of decoder (310), including channel (512), receiver (510), buffer (515), and parser (520) may not be fully implemented in local decoder (633).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (630) may perform motion compensated predictive coding, which codes an input frame predictively with reference to one or more previously-coded frames from the video sequence that were designated as "reference frames." In this manner, the coding engine (632) codes differences between pixel blocks of an input frame and pixel blocks of reference frame(s) that may be selected as prediction reference(s) to the input frame.

The local video decoder (633) may decode coded video data of frames that may be designated as reference frames, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference frames and may cause reconstructed reference frames to be stored in the reference picture cache (634). In this manner, the encoder (303) may store copies of reconstructed reference frames locally that have common content as the reconstructed reference frames that will be obtained by a far-end video decoder (absent transmission errors).

The predictor (635) may perform prediction searches for the coding engine (632). That is, for a new frame to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the video coder (630), including, for example, setting of parameters and subgroup parameters used for encoding the video data.

Output of all aforementioned functional units may be subjected to entropy coding in the entropy coder (645). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare it for transmission via a communication channel (660), which may be a hardware/software link to a storage device which would store the encoded video data. The transmitter (640) may merge coded video data from the video coder (630) with other data to be transmitted, for example, coded audio data and/or ancillary data streams (sources not shown).

The controller (650) may manage operation of the encoder (303). During coding, the controller (650) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The video coder (630) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 7:
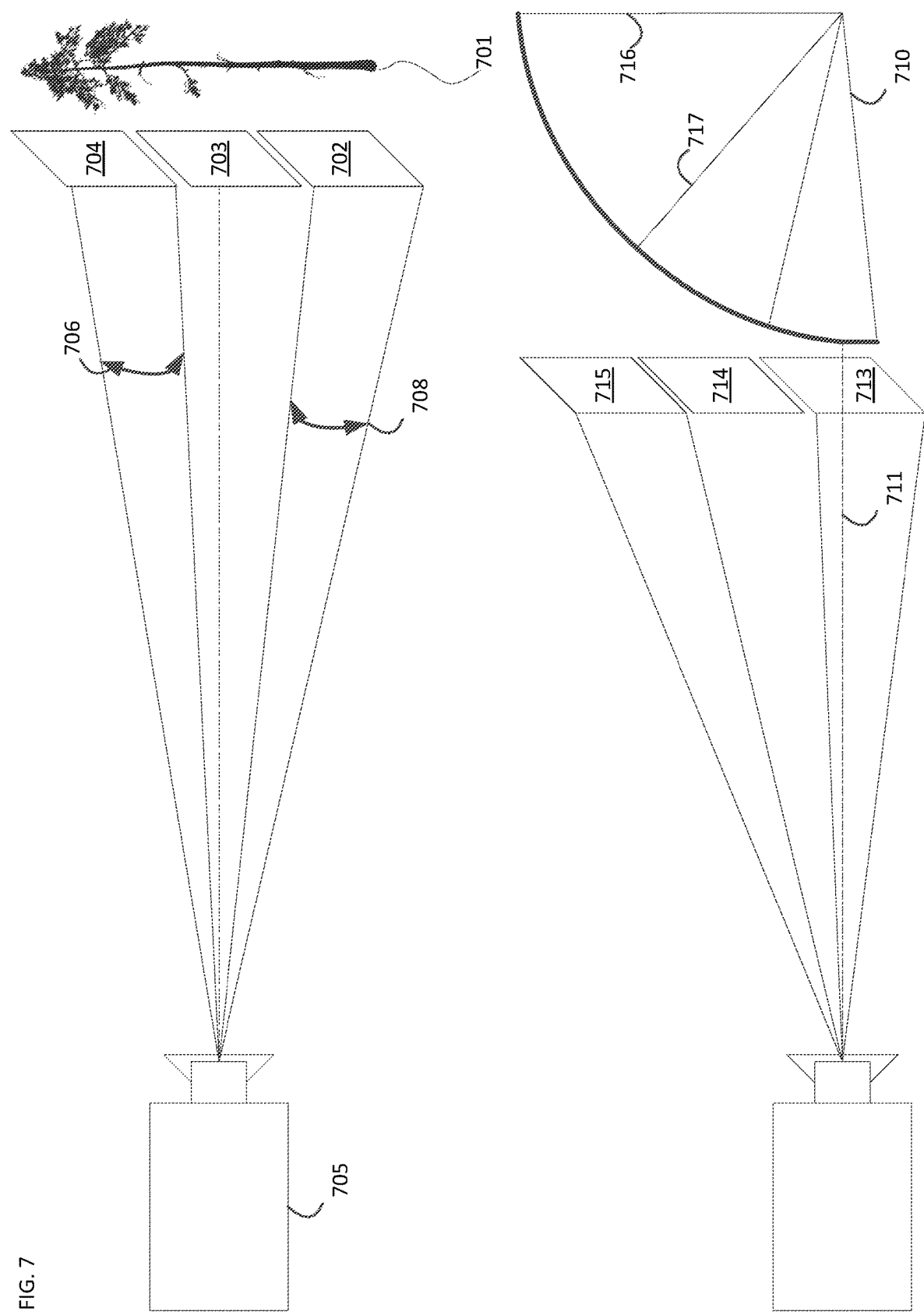
FIG. 7 is a schematic illustration of projections.

When coding or decoding samples from a planar video source, all samples can represent approximately the same angular interval of a projection plane perpendicular to the axis of capture and in a sufficient distance, as measured from the camera's viewpoint. Referring to FIG. 7, as an example, consider the vertical dimension of a projected surface (701), divided in to sample (702, 703, 704), that is captured by camera (705). The sample sizes are drawn out of proportion; in a real system, the vertical resolution of a camera can be 720, 1080, or more samples and not only three. It can be observed that the angular interval (706, 708) representing the samples are approximately the same. Assuming the scene being reasonably flat and approximately perpendicular to the axis of capture (709), the samples (702, 703, 704) are also of approximately the same size. This relationship is known since the advent of photography and lenses for cameras can be designed to create this relationship as close as possible, even under circumstances that require optical correction, such as a close distance of the camera to the scene being captured in relation to the size of the scene.

Still referring to FIG. 7, consider now the capture of a scene that is a sphere (710) (only one quarter of the sphere is depicted) using a simplified representation of an equirectangular projection, with only one dimension depicted. Assume the axis of capture (711) is perpendicular to the equator of the sphere (not depicted). Shown are three samples (713, 714, 715) with identical angular width (not depicted). Intuitively, it seems clear that samples close to the equator represent considerably less surface area of the sphere than samples responsible for depicting polar areas. For example, consider sample 715, which represents the northernmost latitudes of the sphere. Its related surface area, shown through dividers (716, 717) is considerably larger than the surface area related to sample 713.

While above example may appear to be extreme, it should be noted that there are projections in common use, that, for practical applications, depict certain polar areas many times larger than warranted by surface area as measured on the sphere. See above for the "Greenland/Australia" example.

Figure 8:
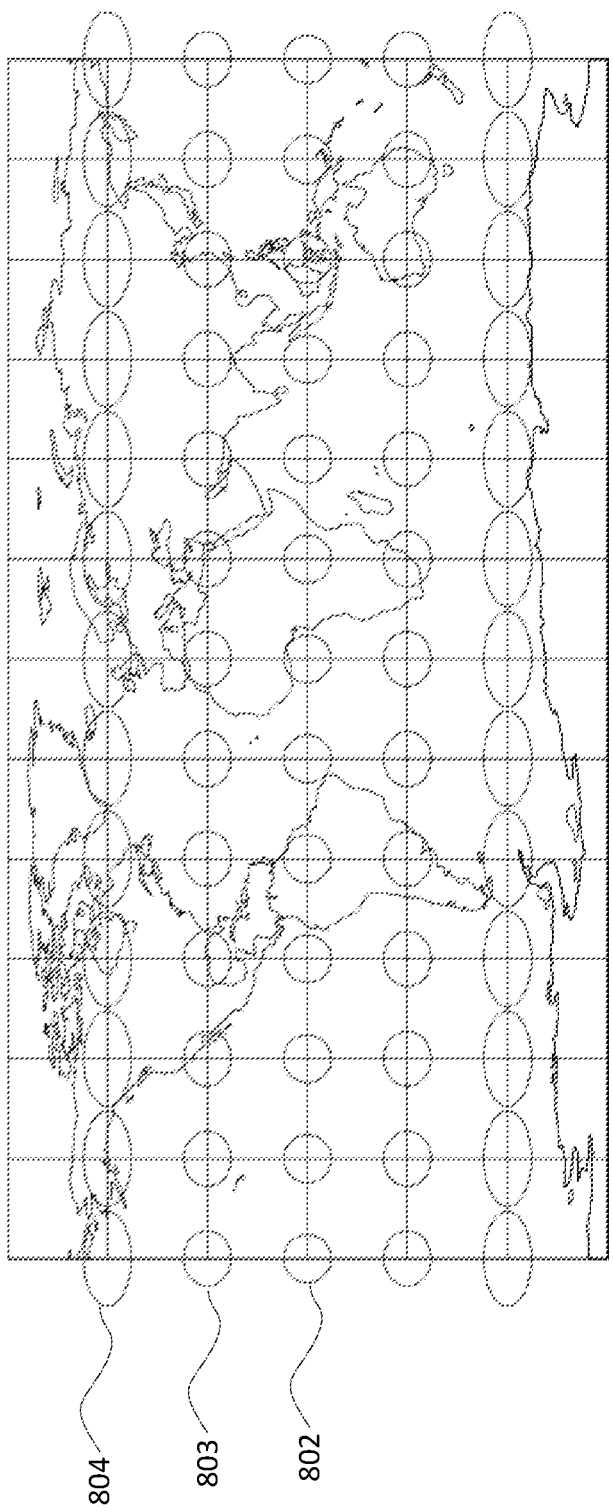
FIG. 8 is a schematic illustration of an equirectangular projection of the surface of earth with a Tissot Indicatrix.

FIG. 8 shows an equirectangular projection of the surface of earth (801). Shown is an example of the well-known Tissot's Indicatrix. Each ellipse (802, 803, 804) superimposed on the map represents a circular surface area on the globe. Assume the projection is represented by a sample map with identical sample size. Clearly, in the regions away from the equator, for example the region represented by ellipse (804), a lot more surface area in the projection, and therefore more samples, represents the same area on the globe's surface than for example ellipse (802) on the equator.

Figure 9:
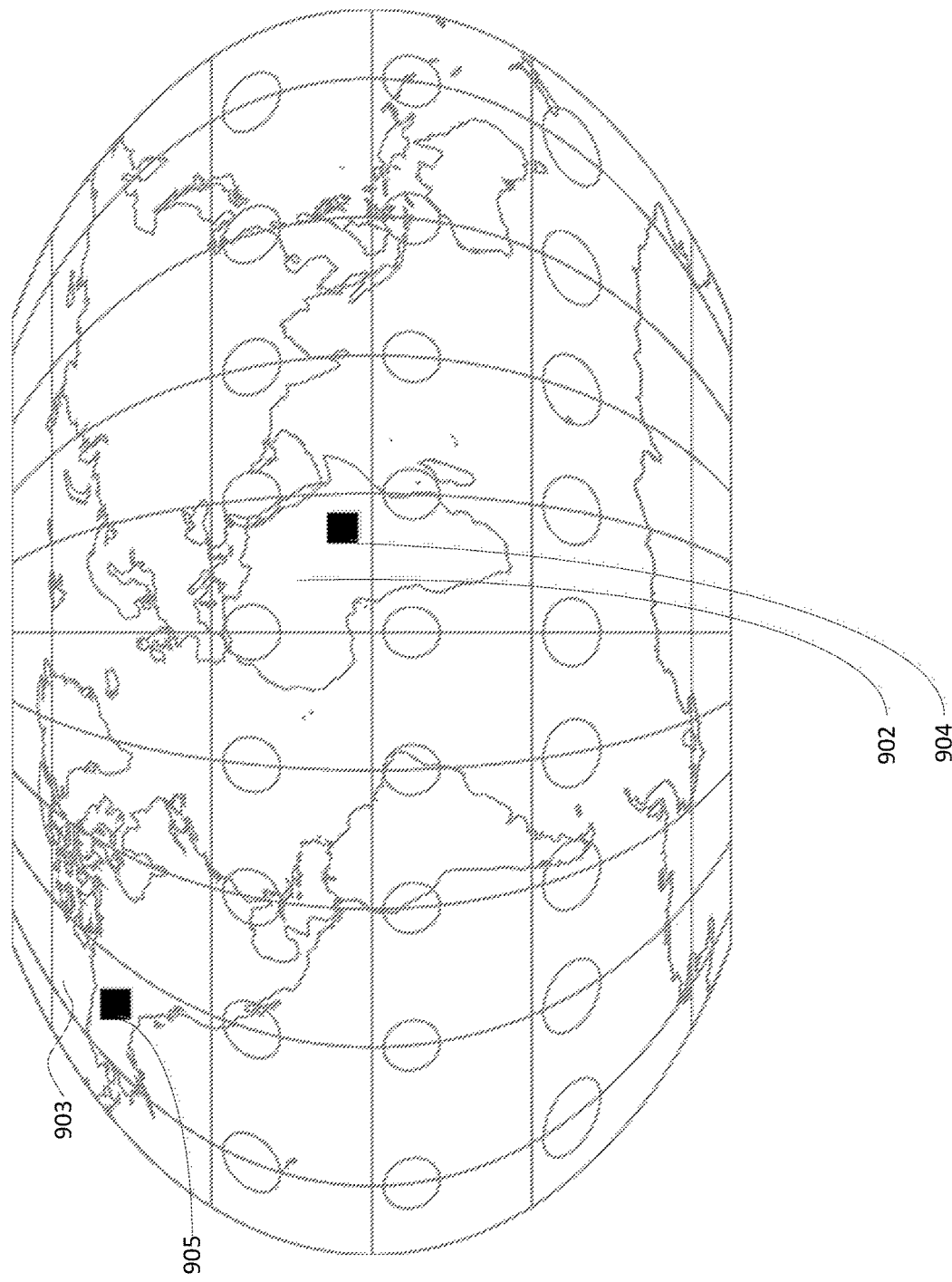
FIG. 9 is a schematic illustration of a Kavrayskiy-VII projection of the surface of earth.

FIG. 9 shows another example of a projection, namely a Kavrayskiy-VII projection (901) of the surface of earth, again overlaid with a Tissot Indicatrix. It also includes a few latitude and longitude "lines;" more specifically, lines of constant latitude or longitude, respectively. On the surface of the globe, each of the lines meet other lines at a right angle, and the surface distance between each meet point is assumed to be the same. Yet, in the projection, especially in certain polar regions as well as away from the meridian, the "square" surface areas are represented by non-square areas. Consider surface area (902), covering northern central Africa. Being close to both equator and the meridian, it is represented approximately (though not exactly) by a square.

Figure 11:
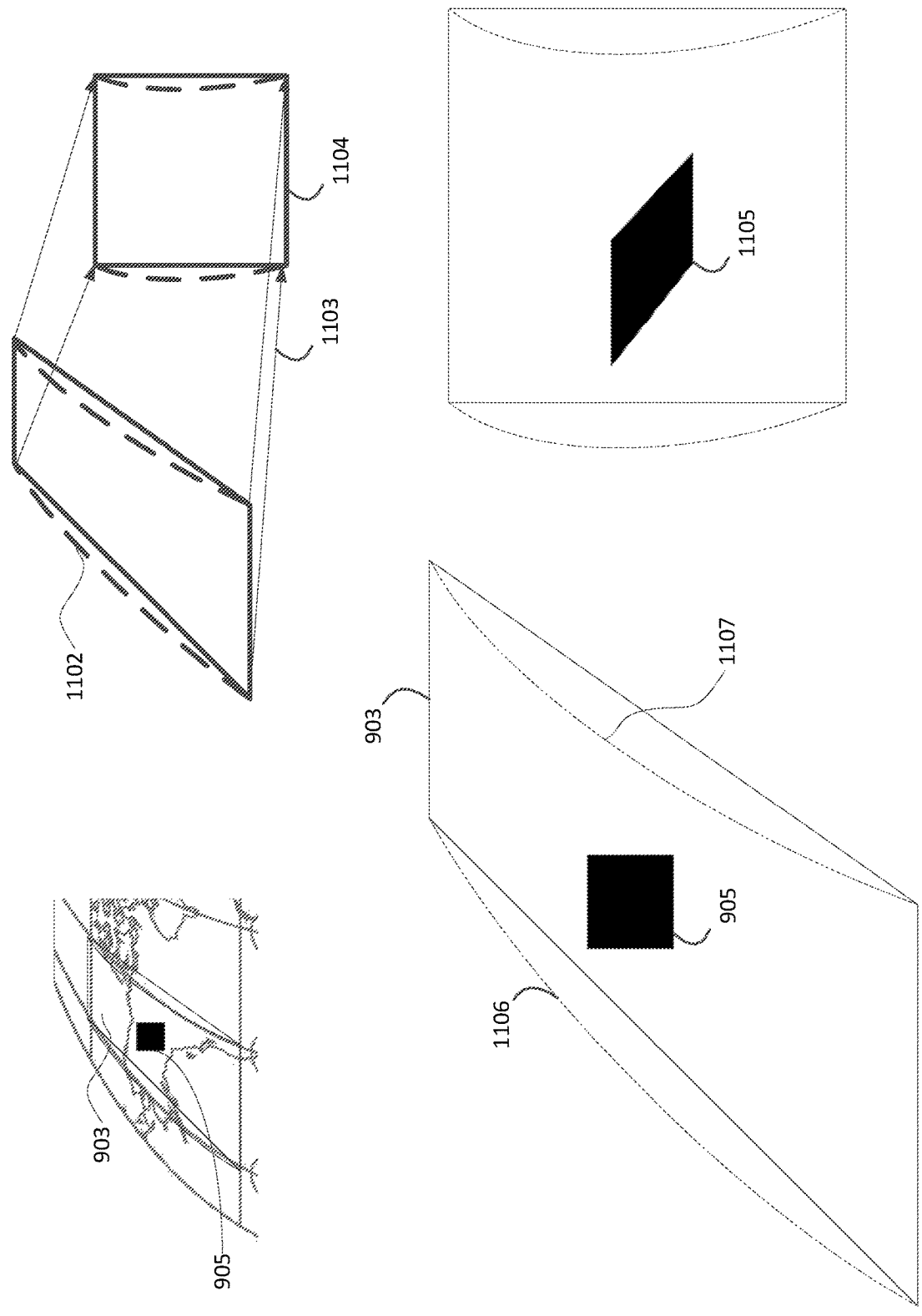
FIG. 11 is a schematic illustration of details of a projection in accordance with an embodiment.

As an extreme counterexample, consider surface area (903), covering most of Alaska. The shape of this (approximately square, on the globe) surface area is grossly distorted. This is illustrated in FIG. 11. Shown is an excerpt of the projection of FIG. 9 with only a small part of the north-western hemisphere (903) depicted; therein a block of samples (905). The shape of the surface area (1102) can be reverse-projected (1103) into a square surface (1104) that is a close approximation of the surface area on the globe. At the bottom of the figure, the same surface area (903) and block (905) are projected as shown above. Note the non-square, distorted geometry of the (on the projection square) block (1105). Further note, that the reverse-projection of the block (905) to the distorted block (1105) is a simplification that simplifies the area (903) to a quadrangle. If the curved nature of the edges of the surface area in the projection (1106, 1107) were taken into account, the block (1105) would be even more distorted.

When, due to projection of a spherical scene onto a planar image used for compression, certain samples of that image represent considerably more surface area or angular width of the spherical scene, then those samples become more relevant for the faithful reproduction of the spherical scene after decompression and de-projection. Similarly, for example when using equirectangular projection, samples depicting equatorial regions of the sphere can be covering a comparatively small surface area, which makes them relatively less relevant for faithful reproduction of the spherical scene. Traditional image and video codecs optimized for planar images and videos to not necessarily address this inequality.

One observation that has to be made is that a planar encoder may well have information on the nature and properties of the projection in use. Also, in a practical system design, this information needs to be made known to the de-projector as well, for example though the bitstream. Without such information, a de-projector may not be able to meaningfully operate on the sample stream produced by the planar decoder. As both encoder and decoder systems can easily obtain side information about the projection in use (that necessarily has to be transmitted from sending to receiving system so to enable the de-projector to inverse-project the scene as created by the projector), the video coding itself does not need to code that information again; the encoder can assume a priori knowledge of it by the decoder. Of course, that side information may also be included in the video bitstream, in which case there may not be a need to send it otherwise.

According to an embodiment, a planar video encoder optimized for the coding of projected 360 video can optimize the coded video sequences it produces based on the encoder's knowledge of the properties of the projection in use.

Ideally, a planar video encoder compressing projected 360 material can put emphasis on those samples that represent larger capture angles or surface areas of the 360 sphere, and conversely less emphasis on those samples that represent smaller capture angles or surfaces areas of the 360 sphere. Using equirectangular projection as an example, and assuming that all surface areas of the 360 sphere are of similar relevance to the user (which is not necessarily the case for map projections, as users rarely are interested in the details of the polar regions—but can well be a valid assumption for 360 video) it is sensible to put more emphasis on samples covering the polar regions, and less emphasis in covering equatorial regions.

Many video codecs allow to comparatively finely tune the number of bits spent for a comparatively small number of samples, namely a transform unit, block, macroblock, and/or the like, ("block" henceforth), by selecting an appropriate quantizer parameter (QP).

In the same or another embodiment, a video encoder uses its a priori knowledge of the nature of a 360 projection to select coarser quantization (numerically higher QP) for blocks that include samples that represent small capture angles or surface areas, when compared to blocks that include samples that represent large capture angles or surface areas. This selection can be implemented locally in the encoder, and no changes are required in the decoder, or in the video compression technology or standard itself to implement it. According to the same or another embodiment, the encoder can create (potentially only once, during initialization and once the details of the projection are known) and use a map of quantization step size difference values ("delta QP values" henceforth), that can be used in conjunction (e.g., added, with later normalization) to the QP values as selected by the (planar-optimized) rate control. In the same or another embodiment, the delta QP map can be created based on the surface area of a block de-projected onto the sphere. In many video codecs, the approximate relationship between QP step sizes and number of bits spent is known. In H.265, for example, there can be an approximate relationship of three QP step sizes and doubling the bit rate. In the same or another embodiment, the delta QP value can be calculated by appropriately setting into relation the aforementioned relationship between a QP value and bitrate, and the de-projected block's surface area.

Briefly referring to FIG. 9, as an example, consider block (904). This block lies next to the equator and can be used for normalization. Accordingly, this block, and its neighbors to the right and left (as well as the adjacent blocks immediately south of the equator) can use a QP delta of 0.

Now consider block (905), covering northern Alaska. The surface area of this block when de-projected on the sphere can be estimated by the relative increase in size of the ellipses of the Tissot projection, and that estimate can be that the block has less than half surface area as the equatorial block. Accordingly, this block can be quantized more coarsely, specifically by 3 quantization step sizes, as three quantization step sizes in H.265 can lead to approximately half the bitrate. When applying such a scheme consistently, the number of bits representing any given area on the sphere is approximately the same, regardless of geometric artifacts introduced by the projection.

Figure 10:
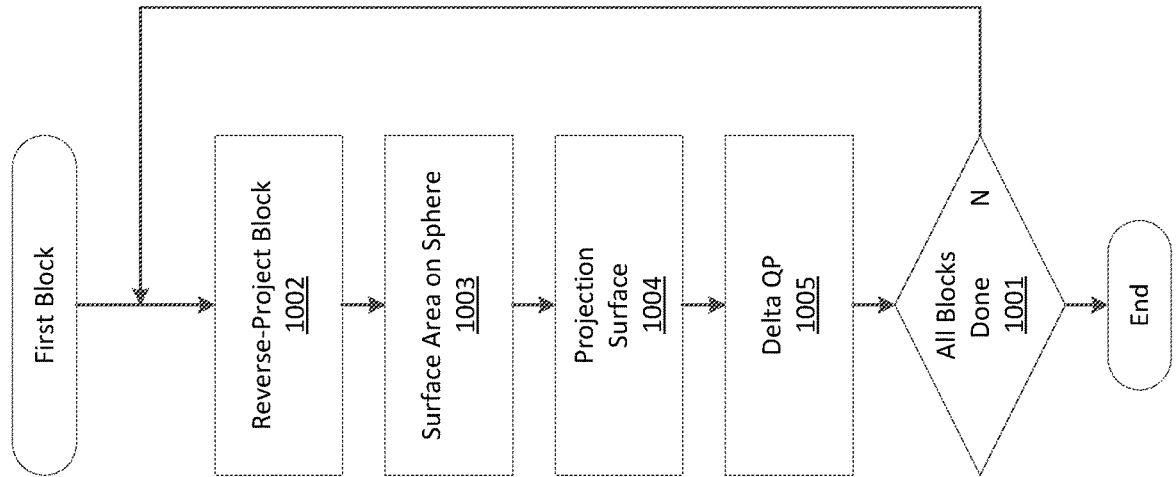
FIG. 10 is a flowchart of an example process for constructing a QP delta map in accordance with an embodiment.

FIG. 10 is a flowchart of an example process 1000 for generating a delta QP map. In some implementations, one or more process blocks of FIG. 10 may be performed by an encoder. In some implementations, one or more process blocks of FIG. 10 may be performed by another device or a group of devices separate from or including an encoder.

Referring to FIG. 10, the mechanism to populate the delta QP map can be described as follows. A loop (1001) can run over all blocks into which the projection is subdivided. The block size can be, for example, 8×8 or 16×16 samples. Within the loop, for each block, the four coordinates of the block can be reverse-projected (1002) onto the sphere, yielding four points in space. The nature of the reverse projection depends on the forward projection. A fifth point in space, namely the center of the sphere, may also be known. Using those four or five points, the surface area on the surface of the sphere identified by the four points and, in some cases, the center of the sphere, can be calculated (1003). When the position of the center of the sphere is not known, the surface area can, in some cases, be approximated under the assumption that the four points form a parallelogram. The nature of the approximation, in this case, can be that the surface area approximated is smaller than the surface area correctly projected on the sphere, as in cases of rectangular projection the surface area is flat whereas on the sphere it would be curved.

The surface area on the sphere can be put in relation to the surface area of the block (e.g., 8×8, or 16×16 samples), to yield a projection increase (1004). The projection increase can be used to determine a delta QP value for this block, using known characteristics or characteristics of the planar video codec in question. For example, in HEVC, the relationship can be that a factor of two in projection increase can lead to a QP value change by a factor of three.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 12:
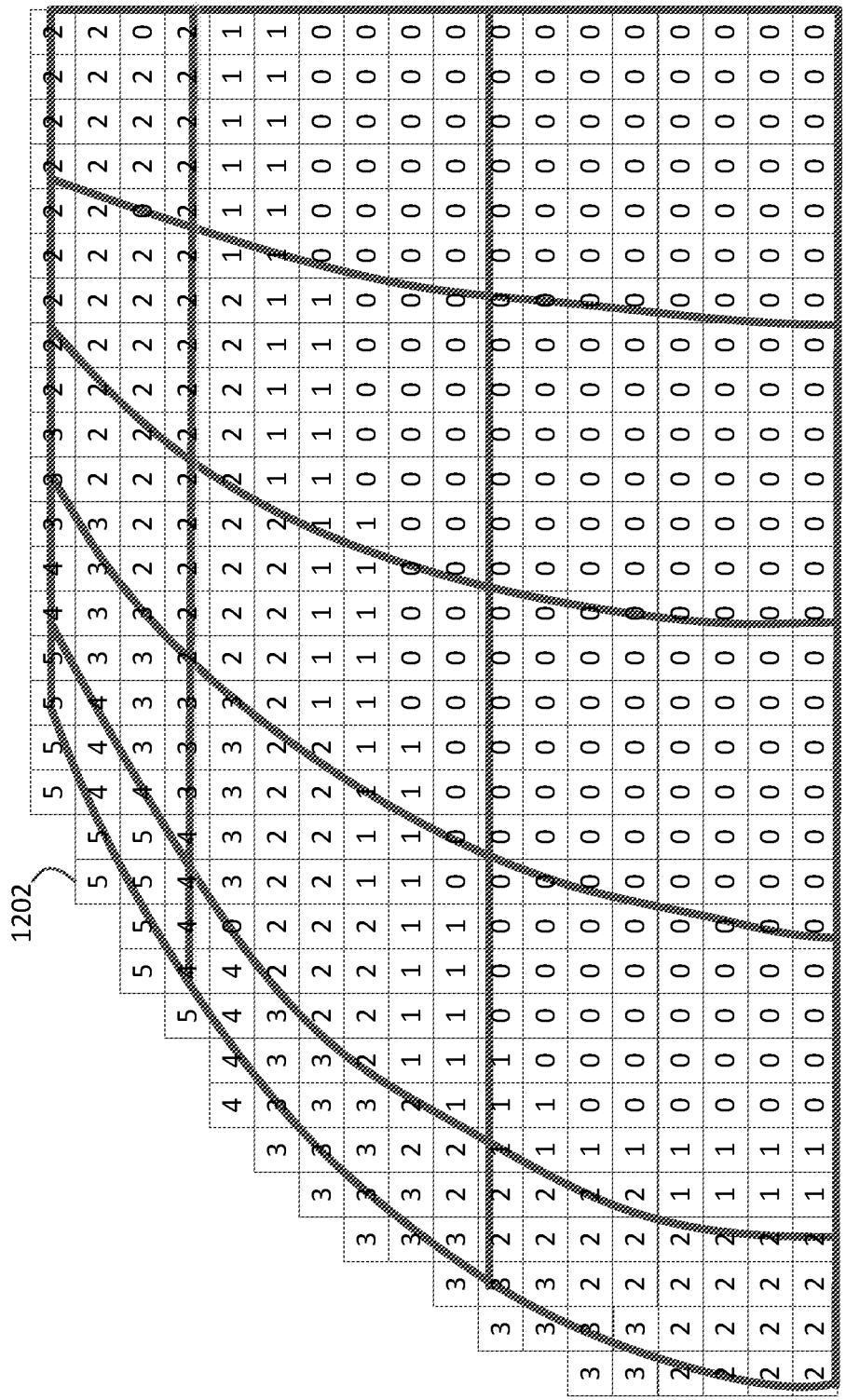
FIG. 12 is a schematic illustration of a delta QP map appropriate for a Kavrayskiy-VII projection of the surface of earth in accordance with an embodiment.

Referring to FIG. 12, shown is an example of a delta QP map that may have been generated by above mechanism, hard-coded into a design, or available to an encoder by some other mechanism. Shown is a quarter of a globe in an exemplary projection depicted in boldface lines (1101), here once more the Kavrayskiy-VII projection. The projection (1201) is overlaid by a grid of blocks (1202) (only a single block is pointed out by numeral (1202)). Each of those blocks is shown with an exemplary delta QP value. It can be observed that the delta QP values increase with the distance from a 0/0 latitude/longitude point in the projection.

The creation of a delta QP map for equirectangular projections (not depicted) can involve the selection of delta QP values of identical values in each row of blocks, and the selection of gradually increasing delta QP values between rows as the distance of a row increases from the equator. Where, exactly, the change from one delta QP value to the next occurs (between which rows) depends on the characteristics of the video compression technology or standard, including the relationship between QP value decrease and bitrate increase.

Figure 13:
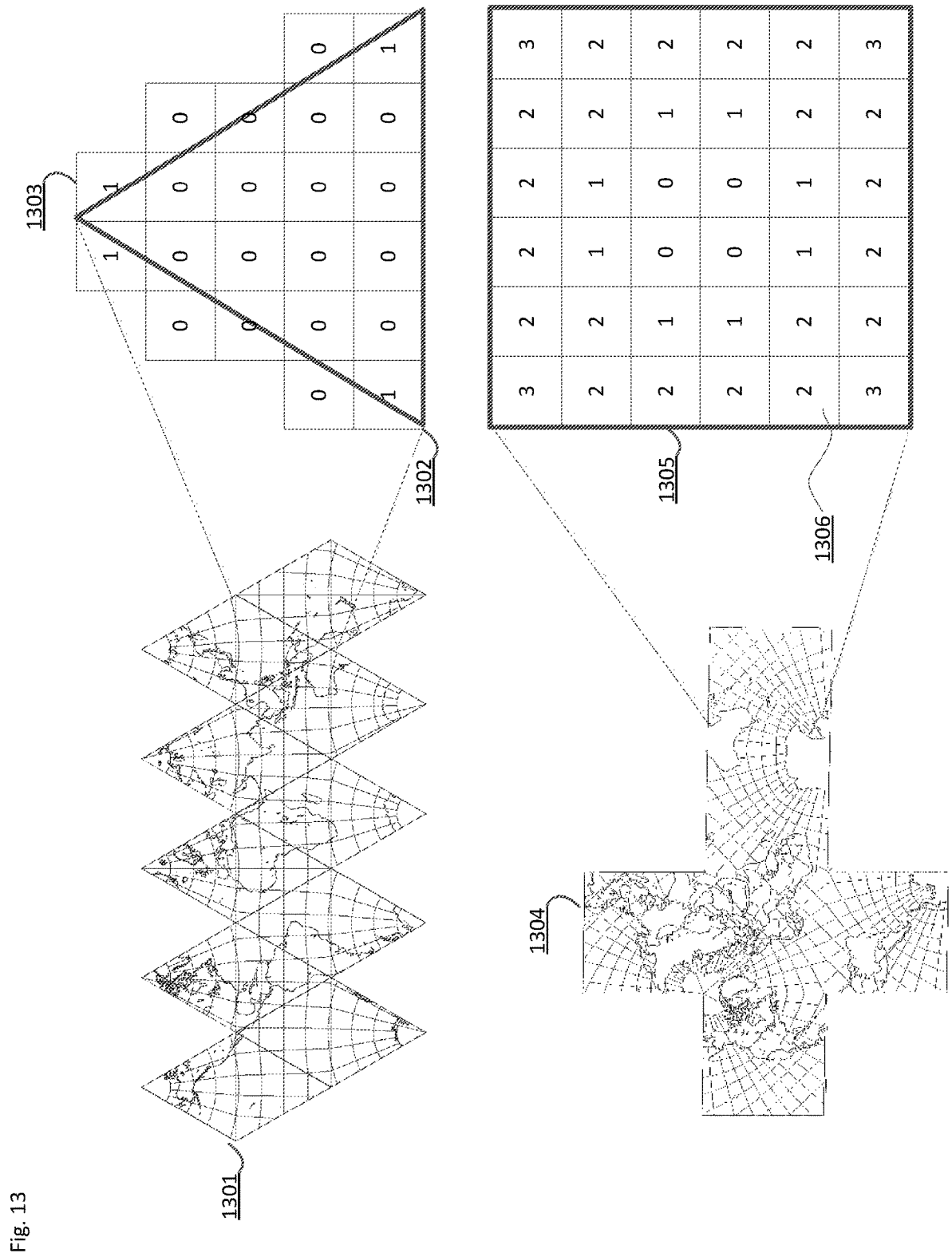
FIG. 13 is a schematic illustration of delta QP maps appropriate for projections in accordance with an embodiment.

FIG. 13 shows, as further examples, delta QP maps for cube and icosahedronal projections. In these projections, the six cube and 20 icosahedron surfaces may be assembled into a single planar surface as already described. As the geometric distortions of these six or 20 surfaces are similar to each other, the delta QP map needs only to be described for one of the squares or triangles shown in the projections.

Taking the icosahedronal projection as a first example, shown is the full projection (1301), of which one of the 20 triangles (1302) is enlarged. Each triangle may be covered by a certain number of blocks; here, six blocks are required to cover the triangle horizontally and five blocks are required vertically, but those numbers may be different depending on block size, desired full projection size, and so on. For each block (1303), an integer number shows a sensible QP value increase when using a video compression technology such as H.265. As each triangle covers a comparatively small area on the sphere's surface, the geometric distortions are comparatively minor, and, therefore, the sensible changes in delta QP value are equally small. For a codec such as H.265, only blocks covering the corners of each triangle may require a slight adjustment in QP value.

In case of a cube projection (1304), in contrast, significant variations of delta QP value per block (1306) may be required to faithfully represent the content. Depicted again is one surface of the cube (1305), which is divided into six by six blocks. For a coding technology such as H.265, only four of the 36 blocks depicted do not require an adjustment in QP value for faithful representation, and, therefore, only four blocks have a delta QP value of 0.

For both cube and other isohedron projections, including icosahedronal projections, the increase of delta QP values can be described as an increase of the delta QP value starting with zero at the center of the isohedron and increasing with increasing distance from the center uniformly in all directions. The rate of the increase can increase with increasing distance, so as to reflect the increasing angle of capture as the edges of the surface are approached.

A person skilled in the art can readily adapt the above mechanism to various other projections and bitrate to delta QP characteristics, block sizes, block shapes, and so on, as required by the application.

When using certain projections, the delta QP value can change several times during the encoding of a picture, or tile, or slice. Each of these changes can cost bits. However, these changes are predictable through the use of the delta QP map, which, as already described, can be constructed in both an encoder and a decoder based on a priori knowledge of the video compression technology or standard in use, and the characteristics of the projection that are equally known in both the encoder and the decoder.

In the same or another embodiment, a decoder can construct a delta QP map, as already described, based on the characteristics of the projection and its knowledge of the compression technology or standard it is based on. In the same or another embodiment, the characteristics of the projection can be made available to the decoder inside the coded video bitstream as one or more normative syntax elements located, for example, in a sequence parameter set, picture parameter set, sequence header, group of pictures (GOP) header, picture header, slice header, or similar syntax structures (high level syntax structures, or HLS structures henceforth). In the same or another embodiment, the characteristics of the projection can be made available to the decoder through an out-of-band mechanism.

The coding of the characteristic can take many forms. In the same or another embodiment, an abstract value of single or a small number of syntax elements can be used to indicate, directly or indirectly, a delta QP map generation mechanism out of a plurality of those mechanisms that may be defined in a video coding technology specification, which can be the same specification the decoder is based on or a different specification. A direct indication can be a direct reference to a delta QP map generation mechanism. An indirect indication can be, for example, a reference to a projection, whose specification may include the QP map generation mechanism and other characteristics such as the geometrical mapping of the planar surface to the sphere surface or the inverse thereof. For example, there can be a syntax element "projection_id," coded as an unsigned integer of, for example 8 bits. This syntax element would allow the signaling of up to 256 projections, each of which may contain its own delta QP map generation mechanism. A corresponding entry in the syntax diagram of an HLS structure can take the following form:

| projection_id | u(8) |
|---|---|

Other forms of coding of the delta QP map can also be possible. For example, the delta QP map can be directly coded into a high level syntax structure. Such coding can be the form of a two dimensional matrix of integer values of a suitable numbering range, such as 0 through 7, wherein each element of the matrix is representative of a block of n×n samples, wherein n can be, for example, 4, 8, or 16. For example, using a syntax commonly employed for video compression technology or standard specification work and under the assumption of square blocks with block sizes that are power of two, "planar_size x," and "planar_size y" representing the size of the planar picture, all measured in samples, such a map can be expressed as:

```
enable_qpmap                                              u(1)
if (enable_qpmap) {
  log2_blocksize                                          u(3)
  blocksize= 2 ** log2_blocksize
  for( y = 0; y < 1 + planar_size_y / blocksize; y++ )
    for ( x = 0; x < 1 + planar_size_x / blocksize; x++ )
      qp_delta [y] [x]                                    b(8)
}
```

In the above syntax diagram, "x" and "y" are running variables, "planar_size_x" and "planar_size_y" represent the size, measured in samples, of the (projected) planar surface, and "blocksize" represents the size of a block for which a delta QP value is coded. That block size can be selected, for example, to be of the same size as the smallest transform, for example 4×4. In that case, the number of "qp_delta" syntax elements can be comparatively large, but that large number can allow a close approximation of the relevance of the individual samples in the projection. Larger block sizes can also be chosen, and that would save bits for the directly coded delta QP map as fewer delta QP values need to be coded; however, the approximation of the relevance of the individual samples in the projection may not be as close. Many relevant video compression technologies or standards use a transform, and the quantization operates on the transform coefficients. For that reason, there is limited benefit in coding the delta QP map at a granularity smaller than the smallest transform block size. The size of the block used for the delta QP map can be coded in a syntax element such as "log 2_blocksize" (log 2 because transform sizes in common use are powers of 2).

In the same or another embodiment, such a directly coded delta QP map may be suitably entropy coded, for example by using an appropriate run-length coding mechanism, a generic compression algorithm known in the art such as .zip, and so forth. A person skilled in the art can readily devise such a coding mechanism for a delta QP map.

The selection between the above two mechanisms and other mechanisms that may serve a similar purpose can depend on the application requirements, and on the compression, computational, and memory constraints such an application may have.

In addition, it can be sensible to include a syntax element "enable_qpmap," which may enable the use of the delta QP map. When a value for that syntax element is "false," the planar decoder may not use the delta QP map. When the value for that syntax element is "true," however, the decoder may use the delta QP map in the way described above, i.e., by adding or subtracting the delta QP values to/from the QP values its planar decoding process has arrived at during decoding.

Figure 14:
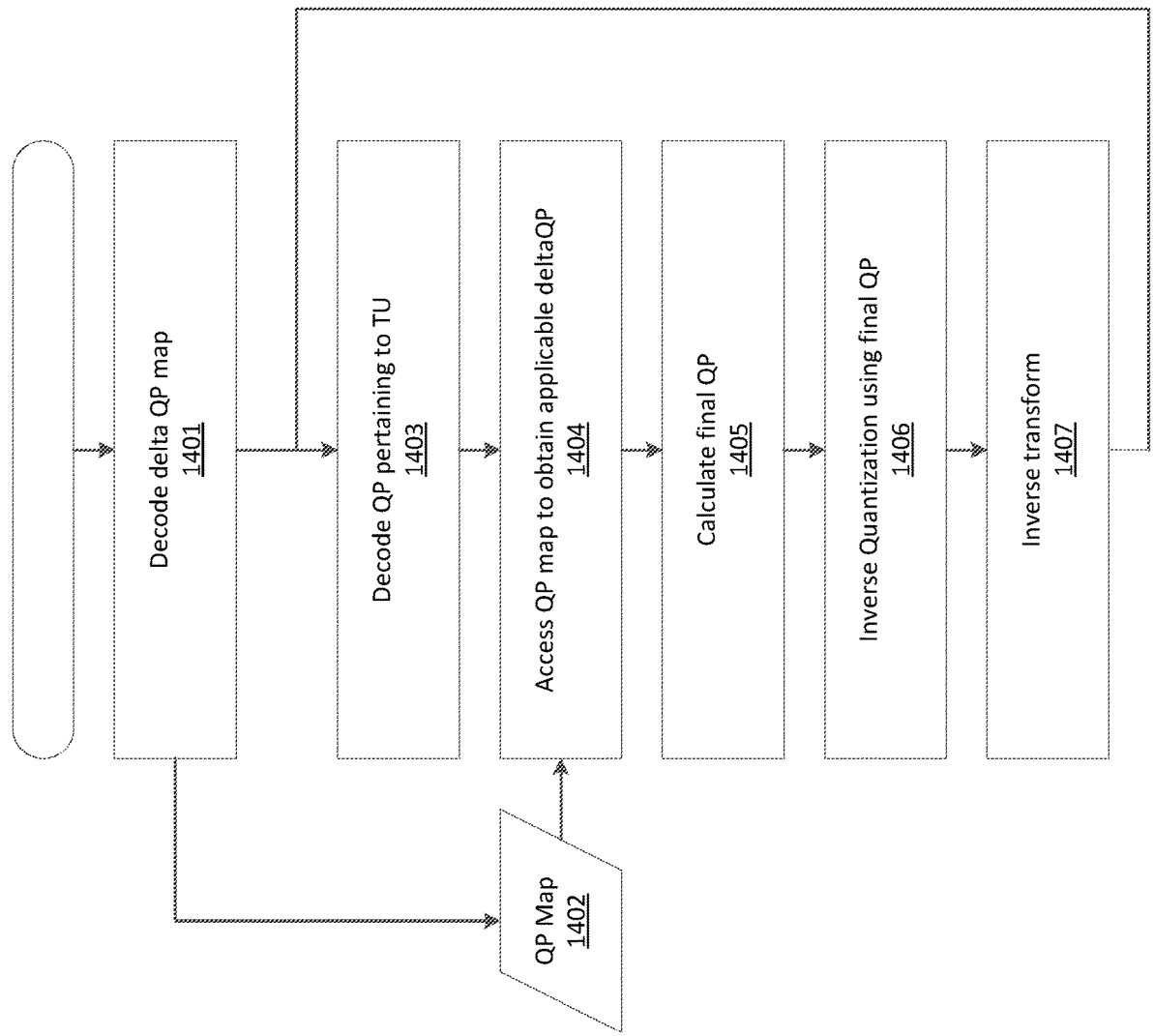
FIG. 14 is a flowchart of the reconstruction of samples in a decoder in accordance with an embodiment.

FIG. 14 is a flowchart of an example process 1400 for reconstruction of samples in a decoder in accordance with an embodiment. In some implementations, one or more process blocks of FIG. 14 may be performed by a decoder. In some implementations, one or more process blocks of FIG. 14 may be performed by another device or a group of devices separate from or including a decoder.

In the same or another embodiment, a decoder can use the delta QP map as follows. Referring to FIG. 14, at some point early in the decoding process, the delta QP map is decoded (1401) and stored in memory (1402). Decoding proceeds as usual in a planar decoder. Specifically, the decoding can involve the decoding of a QP value from the bitstream (1403). That QP value pertains to a Transform Unit (TU). The spatial position of that TU is known by the decoder. At this point, the decoder can access the stored delta QP map (1404) and identify one or more delta QP values that pertain to the block (e.g., interim delta QP values).

The TU size and the block size of the delta QP map do not necessarily have to be the same and do not necessarily need to be aligned with respect to the edges of the TU and the delta QP map block. If the TU's spatial area is fully included in the block of the delta QP map, then there may be only a single delta QP value that can be applied directly, for example by adding or subtracting its value to the QP value of the TU as decoded, so as to obtain a final QP value (1405). If the spatial area of the TU spans multiple blocks of the delta QP map, then the determination of the applicable delta QP value is not as straightforward, as the delta QP values in the delta QP map of the various blocks may be different. Certain alternatives present themselves, and a video coding technology or standard can specify one or more of the following alternatives, or another suitable alternative a person skilled in the art may readily identify.

As a first alternative, on the theory that at least parts of the TU require fine representation, the finest quantization possible can be chosen; in other words, selected is the delta QP value that, when added/subtracted to the decoded QP value results in the numerically smallest final QP value.

As a second alternative, the various delta QP values may be combined by, for example, calculating the median, average, or any other combination of the applicable delta QP values, with appropriate rounding.

As a third alternative, it should be noted that TUs as well as delta QP blocks cover spatial areas represented as samples. In certain video compression technologies and standards, neither with TUs nor with delta QP blocks, there can be an overlap in sample space; that is, each sample position belongs to exactly one TU and exactly one delta QP block. For those video compression technologies and standards, the selection of the delta QP value for the TU can be made by identifying into which block of the delta QP map a certain sample position in the TU falls. Such sample positions in the TU can, for example, include the top left sample position of the TU, the center sample position, or any other sample position in the TU. The delta QP value for the decoding of the TU can then be the delta QP value associated with the block in the delta QP map which includes that sample position.

As long as encoder and decoder use the same combination mechanism, inconsistencies and coding drift can be avoided. A video compression technology specification or standard can easily define which combination to use.

The final QP value obtained above can be used for the inverse-quantization (1406) of the transform coefficients. The de-quantized transform coefficients are then subjected to the inverse transform (1407) to obtain interim sample values used for further processing in compliance with the video coding technology or standard (not depicted). The processing continues with the next TUs until the end of the coded video sequence (not depicted).

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
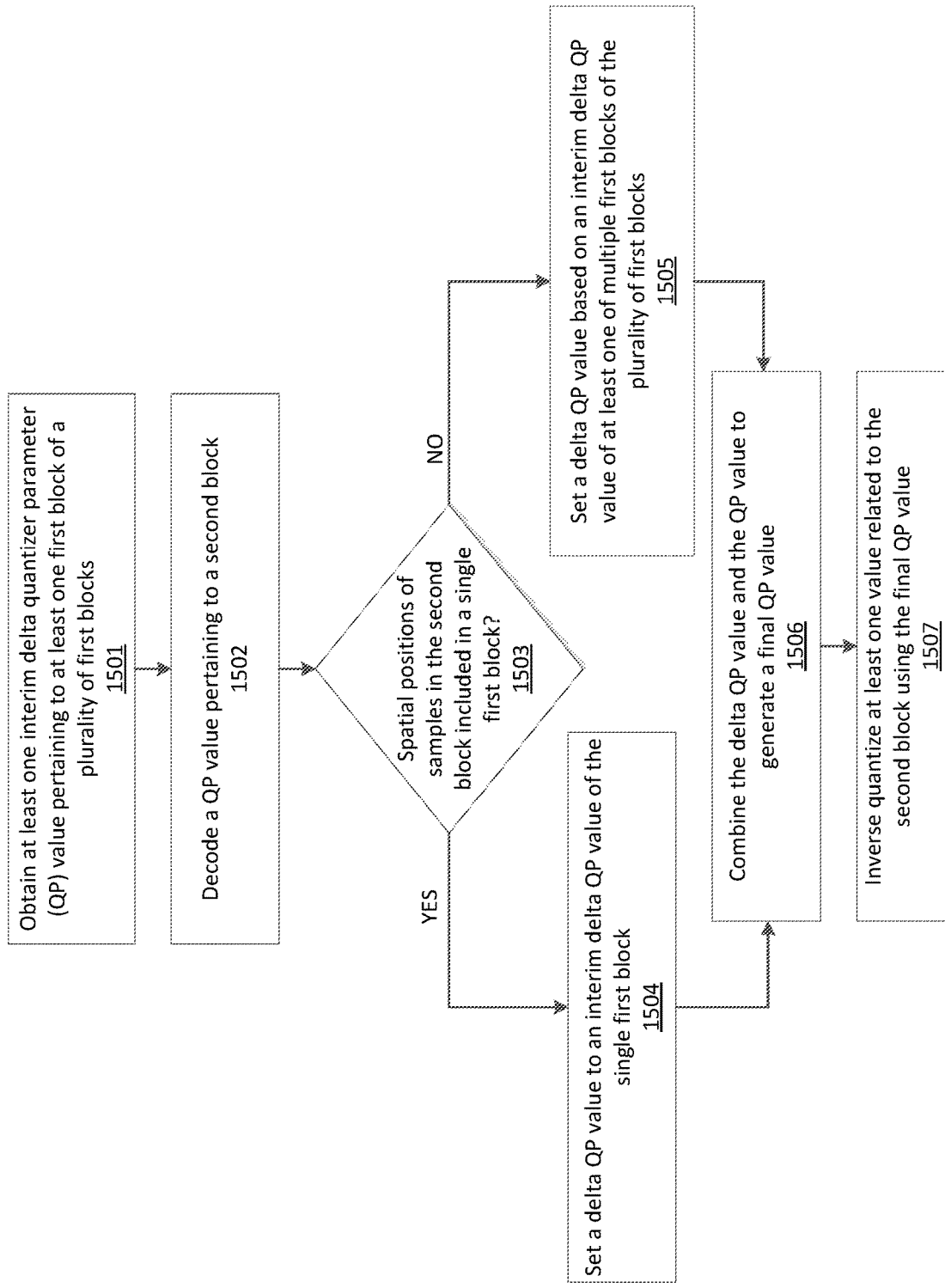
FIG. 15 is a flowchart of generating a final QP value and performing inverse quantization using the final QP value.

FIG. 15 is a flowchart of an example process 1500 for generating a final QP value and performing inverse quantization using the final QP value. In some implementations, one or more process blocks of FIG. 15 may be performed by a decoder. In some implementations, one or more process blocks of FIG. 15 may be performed by another device or a group of devices separate from or including a decoder.

As shown in FIG. 15, process 1500 may include obtaining at least one interim delta quantizer parameter (QP) value pertaining to at least one first block of a plurality of first blocks (block 1501).

As further shown in FIG. 15, process 1500 may include decoding a QP value pertaining to a second block (block 1502).

As further shown in FIG. 15, process 1500 may include determining whether respective spatial positions of samples in the second block are included in a single first block of the plurality of first blocks (block 1503).

As further shown in FIG. 15, if respective spatial positions of samples in the second block are included in a single first block of the plurality of first blocks (block 1503—YES), then process 1500 may include setting a delta QP value to an interim delta QP value of the single first block (block 1504).

As further shown in FIG. 15, if the respective spatial positions of the samples in the second block are included in multiple first blocks of the plurality of first blocks (block 1503—NO), then process 1500 may include setting a delta QP value based on an interim delta QP value of at least one of multiple first blocks of the plurality of first blocks (block 1505).

As further shown in FIG. 15, process 1500 may include combining the delta QP value and the QP value to generate a final QP value (block 1506).

As further shown in FIG. 15, process 1500 may include inverse quantizing at least one value related to the second block using the final QP value (block 1507).

Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

The techniques for QP selection for 360 image and video coding, described above, can be implemented as computer software using computer-readable instructions and physically stored in one or more computer-readable media. For example, FIG. 16 shows a computer system 1600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
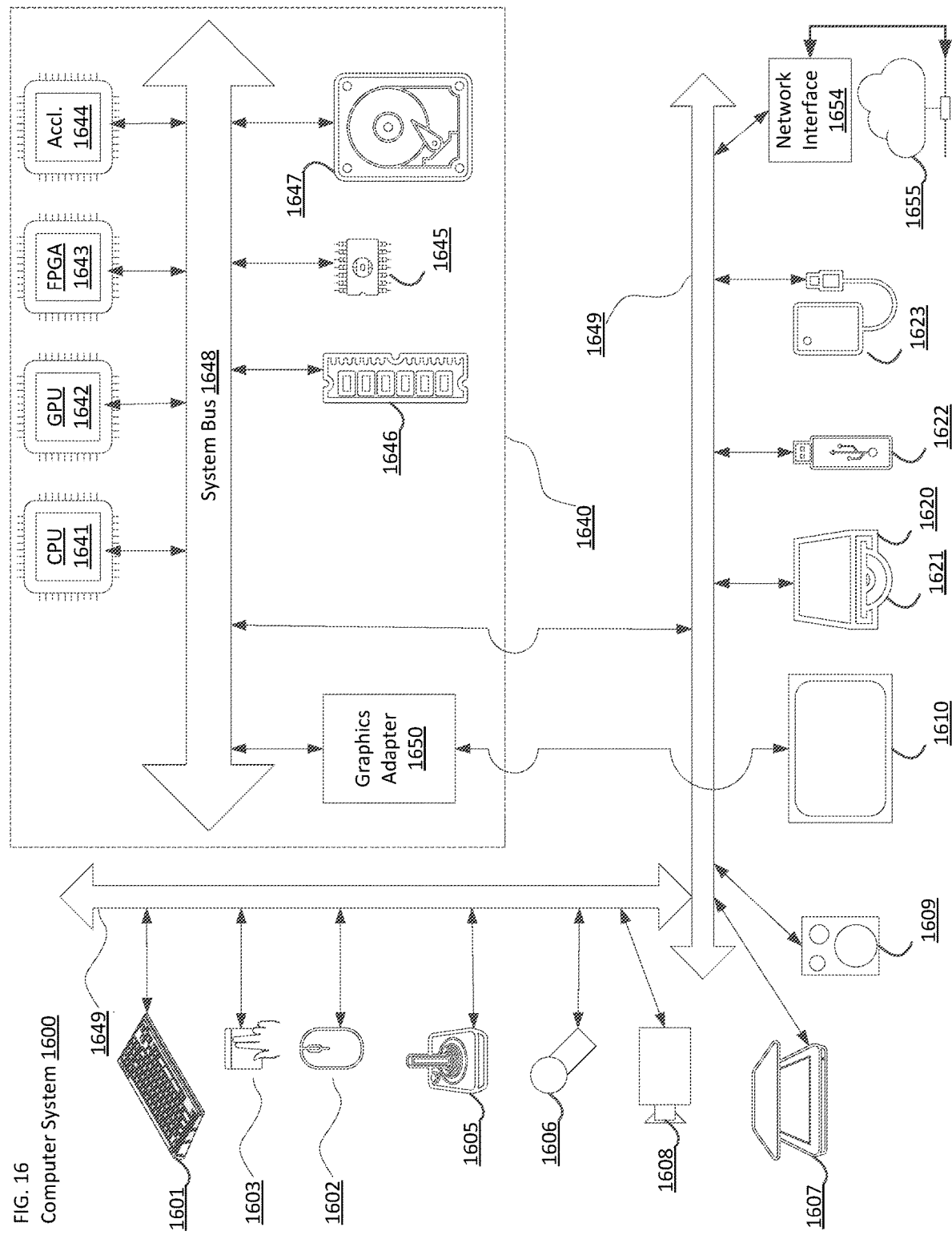
FIG. 16 is a schematic illustration of a computer system in accordance with an embodiment.

The components shown in FIG. 16 for computer system 1600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1600.

Computer system 1600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1601, mouse 1602, trackpad 1603, touch screen 1610, data-glove 1604, joystick 1605, microphone 1606, scanner 1607, camera 1608.

Computer system 1600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1610, data-glove 1604, or joystick 1605, but there can also be tactile feedback devices that do not serve as input devices), audio output devices (such as: speakers 1609, headphones (not depicted)), visual output devices (such as screens 1610 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1600 can also include human accessible storage devices and their associated media such as optical media including CD/DVD ROM/RW 1620 with CD/DVD or the like media 1621, thumb-drive 1622, removable hard drive or solid state drive 1623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1600 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example universal serial bus (USB) ports of the computer system 1600; others are commonly integrated into the core of the computer system 1600 by attachment to a system bus as described below (for example Ethernet interface into a PC computer system or cellular network interface into a smartphone computer system). Using any of these networks, computer system 1600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1640 of the computer system 1600.

The core 1640 can include one or more Central Processing Units (CPU) 1641, Graphics Processing Units (GPU) 1642, specialized programmable processing units in the form of Field Programmable Gate Areas (FPGA) 1643, hardware accelerators for certain tasks 1644, and so forth. These devices, along with Read-only memory (ROM) 1645, Random-access memory (RAM) 1646, internal mass storage such as internal non-user accessible hard drives, solid-state drives (SSDs), and the like 1647, may be connected through a system bus 1648. In some computer systems, the system bus 1648 can be accessible in the form of one or more physical plugs to enable extensions by additional CPUs, GPU, and the like. The peripheral devices can be attached either directly to the core's system bus 1648, or through a peripheral bus 1649. Architectures for a peripheral bus include peripheral component interconnect (PCI), USB, and the like.

CPUs 1641, GPUs 1642, FPGAs 1643, and accelerators 1644 can execute certain instructions that, in combination, can make up the aforementioned computer code. That computer code can be stored in ROM 1645 or RAM 1646. Transitional data can be also be stored in RAM 1646, whereas permanent data can be stored for example, in the internal mass storage 1647. Fast storage and retrieve to any of the memory devices can be enabled through the use of cache memory, that can be closely associated with one or more CPU 1641, GPU 1642, mass storage 1647, ROM 1645, RAM 1646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1600, and specifically the core 1640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1640 that are of non-transitory nature, such as core-internal mass storage 1647 or ROM 1645. The software implementing various embodiments of the present disclosure can be stored in such devices and executed by core 1640. A computer-readable medium can include one or more memory devices or chips, according to particular needs. The software can cause the core 1640 and specifically the processors therein (including CPU, GPU, FPGA, and the like) to execute particular processes or particular parts of particular processes described herein, including defining data structures stored in RAM 1646 and modifying such data structures according to the processes defined by the software. In addition or as an alternative, the computer system can provide functionality as a result of logic hardwired or otherwise embodied in a circuit (for example: accelerator 1644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms:
Quantizer Parameter (QP)
Versatile Video Coding (VVC)
Selective Forwarding Unit (SFU)
Supplementary Enhancement Information (SEI)
Video Usability Information (VUI)
Groups of Pictures (GOPs)
Coding Units (CUs)
Transform Units (TUs)
Prediction Units (PUs)
Hypothetical Reference Decoder (HRD)
signal-to-noise ratio (SNR)
group of pictures (GOP)
Intra Picture (I picture)
Predictive picture (P picture)
Bi-directionally Predictive Picture (B Picture)
High Efficiency Video Coding (HEVC)
High Level Syntax (HLS)

The invention claimed is:

1. A method for decoding a coded image or picture in a coded video sequence in a decoder, the image or picture representing a projection on a planar surface of a non-planar surface, the decoder employing a de-quantization step, the method comprising:
    obtaining at least one interim delta quantizer parameter (QP) value pertaining to at least one first block of a plurality of first blocks;
    decoding a QP value pertaining to a second block;
    combining a delta QP value and the QP value to generate a final QP value; and
    inverse quantizing at least one value related to the second block using the final QP value;
    wherein
        if respective spatial positions of samples in the second block are included in a single first block of the plurality of first blocks, the delta QP value is set to an interim delta QP value of the single first block; or
        if the respective spatial positions of the samples in the second block are included in multiple first blocks of the plurality of first blocks, the delta QP value is set based on an interim delta QP value of at least one of the multiple first blocks of the plurality of first blocks.

2. The method of claim 1, wherein the combining is an addition of the QP value and the delta QP value.

3. The method of claim 1, wherein the combining is a subtraction of the delta QP value from the QP value.

4. The method of claim 1, wherein the obtaining the at least one interim delta QP value pertaining to the at least one first block involves establishing a delta QP map pertaining to the plurality of first blocks.

5. The method of claim 4, wherein the establishing of the delta QP map comprises decoding at least one syntax element pertaining to a projection format, and creating the delta QP map using a characteristic of the projection format.

6. The method of claim 4, wherein the establishing of the delta QP map comprises decoding of a plurality of integer values representing delta QP values in the delta QP map, wherein the plurality of integer values are included in a bitstream in an entropy coded format.

7. The method of claim 1, further comprising:
    combining the interim delta QP values of the multiple first blocks of the plurality of first blocks by a calculation of an average and rounding of interim delta QP values of the multiple first blocks.

8. The method of claim 1, wherein the decoder uses an inverse transform, and the value pertaining to the second block is a transform coefficient of the second block.

9. The method of claim 1, further comprising:
    determining, using interim QP delta values of the multiple first blocks, an interim delta QP value that results in a numerically smallest final QP value when combined with the QP value pertaining to the second block; and
    setting the interim delta QP value, that results in the numerically smallest final QP value, as the delta QP value.

10. The method of claim 9, further comprising:
    subtracting the interim delta QP value, that results in the numerically smallest final QP value, and the QP value to generate the final QP value.

11. The method of claim 1, further comprising:
    combining the interim delta QP values of the multiple first blocks of the plurality of first blocks by a calculation of a median of the interim delta QP values of the multiple first blocks.

12. A device, comprising:
    at least one memory configured to store program code;
    at least one processor configured to read the program code and operate as instructed by the program code to:

obtain at least one interim delta quantizer parameter (QP) value pertaining to at least one first block of a plurality of first blocks;

decode a QP value pertaining to a second block;

combine a delta QP value and the QP value to generate a final QP value; and inverse quantize at least one value related to the second block using the final QP value;

wherein if respective spatial positions of samples in the second block are included in a single first block of the plurality of first blocks, the delta QP value is set to an interim delta QP value of the single first block; or if the respective spatial positions of the samples in the second block are included in multiple first blocks of the plurality of first blocks, the delta QP value is set based on an interim delta QP value of at least one of the multiple first blocks of the plurality of first blocks.

13. The device of claim 12, wherein the program code is configured to cause the at least one processor to:

add the QP value and the delta QP value to generate the final QP value.

14. The device of claim 12, wherein the program code is configured to cause the at least one processor to:

subtract the delta QP value from the QP value to generate the final QP value.

15. The device of claim 12, wherein the program code is configured to cause the at least one processor to:

obtain the at least one interim delta QP value pertaining to the at least one first block by establishing a delta QP map pertaining to the plurality of first blocks.

16. The device of claim 12, wherein the program code is configured to cause the at least one processor to:

combine the interim delta QP values of the multiple first blocks of the plurality of first blocks by a calculation of an average and rounding of interim delta QP values of the multiple first blocks.

17. The device of claim 12, wherein the program code is configured to cause the at least one processor to:

combine the interim delta QP values of the multiple first blocks of the plurality of first blocks by a calculation of a median of the interim delta QP values of the multiple first blocks.

18. The device of claim 12, wherein the program code is configured to cause the at least one processor to:

establish a delta QP map by decoding at least one syntax element pertaining to a projection format, and create the delta QP map using a characteristic of the projection format.

19. The device of claim 12, wherein the device uses an inverse transform, and the value pertaining to the second block is a transform coefficient of the second block.

20. A non-transitory computer-readable medium storing instructions, the instructions comprising: one or more instructions that, when executed by one or more processors of a device, cause the one or more processors to:

obtain at least one interim delta quantizer parameter (QP) value pertaining to at least one first block of a plurality of first blocks;

decode a QP value pertaining to a second block;

combine a delta QP value and the QP value to generate a final QP value; and inverse quantize at least one value related to the second block using the final QP value;

wherein if respective spatial positions of samples in the second block are included in a single first block of the plurality of first blocks, the delta QP value is set to an interim delta QP value of the single first block; or if the respective spatial positions of the samples in the second block are included in multiple first blocks of the plurality of first blocks, the delta QP value is set based on an interim delta QP value of at least one of the multiple first blocks of the plurality of first blocks.

* * * * *